United States Patent
Sugizaki (10) Patent No.: US 8,255,601 B2
(45) Date of Patent: Aug. 28, 2012

(54) TRANSMITTING SYSTEM, APPARATUS, AND METHOD

(75) Inventor: Go Sugizaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 129 days.

(21) Appl. No.: 12/453,936

(22) Filed: May 27, 2009

(65) Prior Publication Data

US 2010/0046364 A1     Feb. 25, 2010

(30) Foreign Application Priority Data

Aug. 21, 2008   (JP) ................................. 2008-213219

(51) Int. Cl.
  *G06F 13/00*   (2006.01)
(52) U.S. Cl. ......................... 710/107; 714/776; 370/503
(58) Field of Classification Search .................. 710/107, 710/305–306; 714/776; 370/503
  See application file for complete search history.

(56) References Cited

U.S. PATENT DOCUMENTS

| 7,197,009 B1 * | 3/2007 | Dispensa ..................... 370/237 |
| 7,400,626 B2 * | 7/2008 | Hong ............................. 370/392 |
| 2005/0240696 A1 * | 10/2005 | Hasegawa et al. ............ 710/105 |

FOREIGN PATENT DOCUMENTS

| JP | 61-045654 | 3/1986 |
| JP | 05-030115 | 2/1993 |
| JP | 2000-013442 | 1/2000 |
| JP | 2000-341252 | 12/2000 |
| JP | 2005-210389 | 8/2005 |

OTHER PUBLICATIONS

Partial Translation for Japanese Patent Publication No. 2000-341252, dated Dec. 8, 2000 (reference previously filed).
Japanese Office Action mailed Mar. 21, 2012, for corresponding Japanese Application No. 2008-213219, with English-language translation.

* cited by examiner

*Primary Examiner* — Brian Misiura
*Assistant Examiner* — Kim Huynh
(74) *Attorney, Agent, or Firm* — Fujitsu Patent Center (57) ABSTRACT

A system includes a first apparatus and a second apparatus connected via a transmission path. The first apparatus includes a transmitting unit that transmits a request as at least one packet and retransmits the at least one request packet if a time period between the request and a response is not less than a predetermined time period; and a receiving unit that receives the response as at least one response packet and discards any error packet and any redundant packet from among the received at least one response packet. The second apparatus includes: a receiving unit that receives the at least one request packet and discards any error packet from among the received at least one request packet; and a transmitting unit that determines a response type, selectively makes the at least one response packet redundant for any response of a specific type, and transmits the redundant response packets.

8 Claims, 11 Drawing Sheets

FIG.2

| PACKET | DATA | TRANSFER DIRECTION | RESCUE PROCESS UPON TRANSMISSION ERROR |
|---|---|---|---|
| FETCH REQUEST | ABSENT | IO→CPU | (FIRST OPERATION TYPE)<br>CPU DISCARDS ERROR PACKET (OR NO PACKET ARRIVES)<br>I/O RETRANSMITS SAME REQUEST AFTER TIMEOUT DETECTION |
| FETCH RESPONSE | PRESENT | IO←CPU | (SECOND OPERATION TYPE)<br>I/O RETRANSMITS SAME REQUEST AFTER TIMEOUT DETECTION<br>CPU PERFORMS REQUEST PROCESS AGAIN |
| STORE REQUEST | PRESENT | IO→CPU | (FIRST OPERATION TYPE)<br>CPU DISCARDS ERROR PACKET (OR NO PACKET ARRIVES)<br>I/O RETRANSMITS SAME REQUEST AFTER TIMEOUT DETECTION |
| STORE RESPONSE | ABSENT | IO←CPU | (THIRD OPERATION TYPE)<br>CPU MAKES RESPONSE PACKET REDUNDANT FOR TRANSMISSION<br>I/O USES NORMAL ONE OF REDUNDANT PACKETS |
| INTERRUPT REQUEST | PRESENT | IO→CPU | (FIRST OPERATION TYPE)<br>CPU DISCARDS ERROR PACKET (OR NO PACKET ARRIVES)<br>I/O RETRANSMITS SAME REQUEST AFTER TIMEOUT DETECTION |
| INTERRUPT RESPONSE | ABSENT | IO←CPU | (THIRD OPERATION TYPE)<br>CPU MAKES RESPONSE PACKET REDUNDANT FOR TRANSMISSION<br>I/O USES NORMAL ONE OF REDUNDANT PACKETS |

TRANSMITTING SYSTEM, APPARATUS, AND METHOD

CROSS-REFERENCE TO RELATED APPLICATION(S)

This application is based upon and claims the benefit of priority of the prior Japanese Patent Application No. 2008-213219, filed on Aug. 21, 2008, the entire contents of which are incorporated herein by reference.

FIELD

The embodiments discussed herein are directed to a transmission system in which apparatuses are connected via a transmission path and a requests for process and a response thereto are transmitted and received via the transmission path, and also to a transmitting apparatus for use in the transmission system, and a transmitting method.

BACKGROUND

In recent years, for an information processing apparatus, various apparatuses, such as a central processing unit (CPU) and an input/output (I/O) processor, are coupled to each other through serial transmission, which is higher in speed than conventional parallel transmission.

This is because, with increasing demand for high data transfer performance among the various apparatuses, it has become difficult for the conventional parallel transmission to ensure sufficient bus width and transfer rate.

High speed serial transmission, on one hand meets the demand for high data transfer performance, but on the other hand, lacks reliability with respect to its data transmission. Thus, the high speed serial transmission requires a data retransmission system for any occurrence of a transmission error.

Transmission errors in the conventional high-speed serial transmission are rescued by using an ACK per packet. Specifically, a transmitting end specifies, for each packet, a sequence number and a cyclic redundancy check (CRC), records the transmitted packet in a retransmission buffer, and holds the recorded packet until an ACK is returned from a receiving end.

The receiving end checks the CRC of the received packet. If the packet has been normally received, the receiving end returns the ACK specifying the sequence number. If a transmission error is detected, however, the packet is discarded, and the receiving end returns a NACK specifying a sequence number of a last normally-received packet.

Further, if the transmitting end receives an ACK response, the transmitting end frees the retransmission buffer for the specified sequence number and any sequence numbers preceding the specified sequence number. If the transmitting end receives a NACK response, the transmitting end transmits the packet of the specified sequence number and any packets of sequence numbers subsequent to the specified sequence number from the retransmission buffer.

Still further, modified examples of packet by packet transmission control are known, such as a communication method of selecting, when packet transmission is performed through a serial bus, either one of communication including handshake transfer using ACK packets and communication without sending ACK packets (for example, see Japanese Laid-open Patent Publication No. 2005-210389) and a technology of making a retransmission request only for a missing packet from a receiving end in packet transmission so as to increase efficiency of data transmission (for example, see Japanese Laid-open Patent Publication No. 2000-341252).

In general, as compared with packet transfer through parallel transmission, latency increases in packet transfer through serial transmission due to serial/parallel conversion and other systems. Therefore, in the conventional packet by packet error-rescue technique, a huge retransmission buffer is required that is capable of holding all transmitted packets from the time of packet transmission to the time of ACK response reception. Moreover, flow control for confirming delivery using ACK/NACK responses is also required.

As such, the conventional serial transmission has a problem of having to spend an enormous cost on circuits and flow control, for a data retransmission system for error rescue. Moreover, even in the conventional parallel transmission, when transmission speed is regarded more important than transmission reliability and thus a recovery system is essential for any occurrence of a transmission error, cost for providing such a recovery system is required.

SUMMARY

According to an aspect of the invention, a transmission system includes a first apparatus and a second apparatus. The first apparatus includes a request transmitting unit that transmits a request as at least one packet and retransmits the at least one request packet if a time period between the request and a response is not less than a predetermined time period; and a response receiving unit that receives the response as at least one response packet and discards any error packet and redundant packet from among the received at least one response packet. The second apparatus is connected to the first apparatus via a transmission path through which the request from the first apparatus to the second apparatus and the response from the second apparatus to the first apparatus are transmitted and received. The second apparatus also includes a request receiving unit that receives the at least one request packet and discards any error packet from among the received at least one request packet; and a response transmitting unit that determines a type of the response, selectively makes the at least one response packet redundant for any response of a specific type, and transmits the redundant response packets.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

An embodiment of a transmission system, a transmitting apparatus, and a transmitting method according to the present invention will be explained in detail with reference to the drawings.

In the present embodiment, a low-cost data retransmission system in high-speed serial transmission is achieved by using the following three operations:

1. without any packet delivery acknowledgement, retransmitting a request packet from a request queue through time monitoring at a requesting end of a request process;

2. rescuing a transmission error of a response packet by performing a request process again; and 3. for a response packet corresponding to a request for which a request process cannot be rerun or performed again, make a packet transfer redundant.

Figure 1:
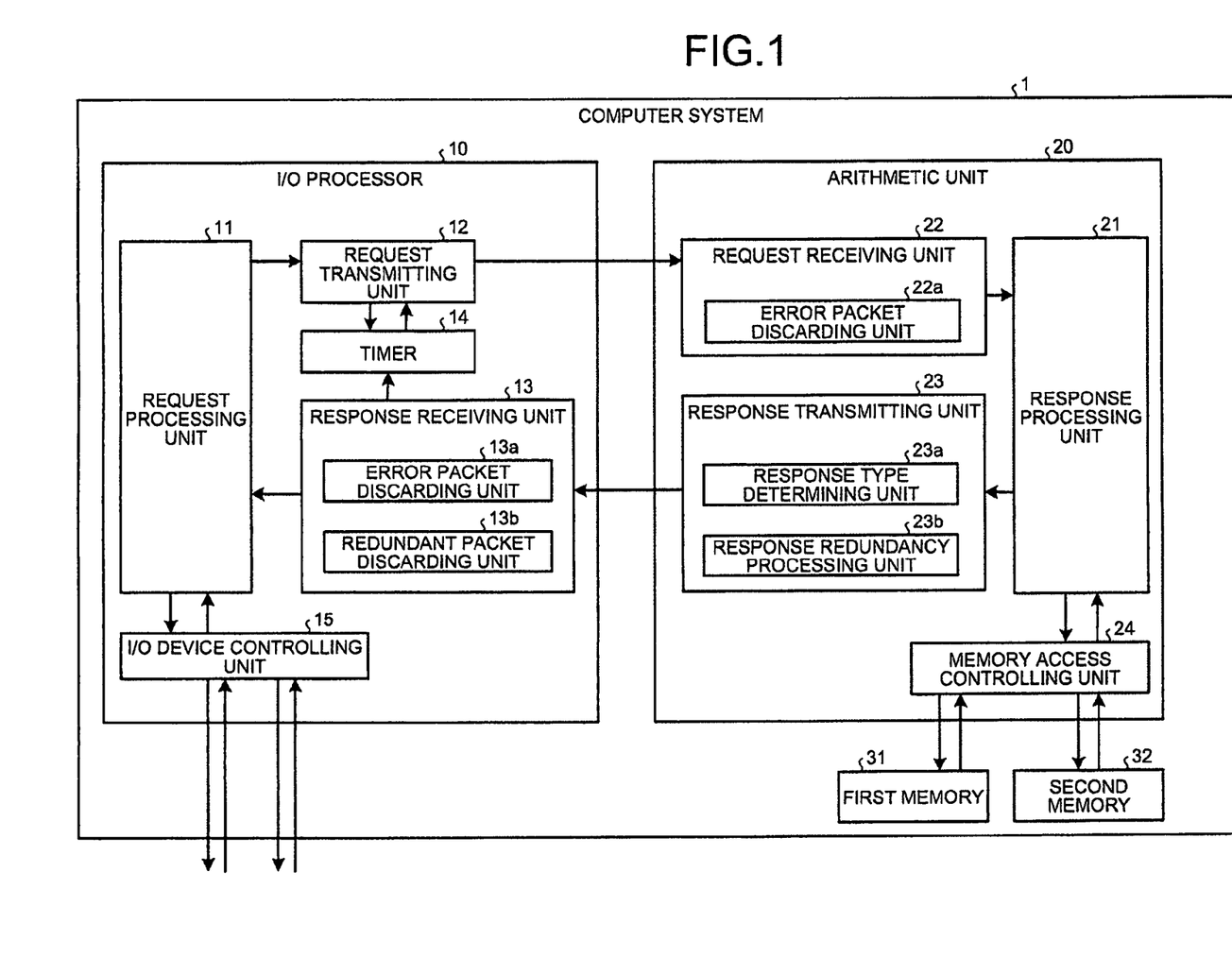
FIG. 1 is a schematic block diagram of a computer system according to an embodiment.

FIG. 1 is a schematic block diagram of a computer system 1 according to the present embodiment. The computer system 1 depicted in FIG. 1 is a serial transmission system in which an Input/Output (I/O) processor 10 and an arithmetic unit 20 (central processing unit) are connected to each other via a serial transmission path.

The I/O processor 10 is connected to an I/O device not illustrated, which is outside of the computer system 1. Upon receiving an input from the I/O device, the I/O processor 10 transmits a request to the arithmetic unit 20 and, upon receiving a response from the arithmetic unit 20, the I/O processor 10 produces an output to the I/O device.

The I/O processor 10 includes therein a request processing unit 11, a request transmitting unit 12, a response receiving unit 13, a timer 14, and an I/O device controlling unit 15. The I/O device controlling unit 15 is an interface that connects to the I/O device not illustrated. The request processing unit 11 performs a process of requesting the arithmetic unit 20 to perform a predetermined process based on an input from the I/O device.

The request transmitting unit 12 performs a process of transmitting a request generated by the request processing unit 11 as a request packet or request packets to the arithmetic unit 20 via the serial transmission path. The response receiving unit 13 performs a process of receiving a request from the arithmetic unit 20 as a response packet or response packets via the serial transmission path.

The timer 14 is a time-keeping unit that measures a time period between transmitting a request from the request transmitting unit 12 and receiving a response at the response receiving unit 13. The request transmitting unit 12 retransmits a request packet if the time period measured for that response is not less than a predetermined time period.

The response receiving unit 13 includes therein an error packet discarding unit 13a and a redundant packet discarding unit 13b. Upon receiving an error packet from the arithmetic unit 20, that is, when an error occurs in a response packet received from the arithmetic unit 20, the error packet discarding unit 13a performs a process of discarding the error packet. Similarly, upon receiving a redundant packet, that is, when the response packet received from the arithmetic unit 20 is identical to an already-received response packet, the redundant packet discarding unit 13b performs a process of discarding the redundant packet.

The arithmetic unit 20 is an apparatus that processes a request received from the I/O processor 10 and responds to the I/O processor 10. The arithmetic unit 20 is connected to a first memory 31 and a second memory 32, and is capable of writing into the memories, that is, so-called storing, and reading from the memories, that is, so-called fetching.

The arithmetic unit 20 includes therein a response processing unit 21, a request receiving unit 22, a response transmitting unit 23, and a memory access controlling unit 24. The request receiving unit 22 performs a process of receiving a request from the I/O processor 10 as a request packet or request packets via the serial transmission path. The request receiving unit 22 includes therein an error packet discarding unit 22a. When an error packet is received from the I/O processor 10, that is, when an error occurs in a request packet received from the I/O processor 10, the error packet discarding unit 22a performs a process of discarding the error packet.

The response processing unit 21 performs a process of processing the request received by the request receiving unit 22 and generating a response. When the request received by the request receiving unit 22 is a fetch request or a store request, the response processing unit 21 writes and reads data into or from the first memory 31 and/or the second memory 32 via the memory access controlling unit 24.

The response transmitting unit 23 performs a process of transmitting the response generated by the response processing unit 21 as a response packet or response packets to the I/O processor 10 via the serial transmission path. The response transmitting unit 23 includes therein a response type determining unit 23a and a response redundancy processing unit 23b.

The response type determining unit 23a determines a type of the response generated by the response processing unit 21. The response redundancy processing unit 23b performs a process of selectively making a response packet redundant with respect to a response of a specific type based on the determination result by the response type determining unit 23a.

The response of the specific type is a response to a request that influences processing results of another request and thus cannot be simply rerun or executed again. Examples of such a request include an interrupt request to the arithmetic unit 20 and a store request. In other words, these requests require a sequential order of request processing to be guaranteed. Therefore, as for a store response, which is a response to a store request, and an interrupt response, which is a response to an interrupt request to the arithmetic unit 20, the response packet is made redundant to be transmitted as a plurality of packets having the same contents.

On the other hand, as for a fetch request for reading data from a memory, the result of executing the request has no influence on another request. Therefore, the response packet is not required to be made redundant.

As described, in the computer system 1, in a request process in which the arithmetic unit 20 executes a request from the I/O processor 10 for processing, the I/O processor 10, which is at a requesting end of the request process, monitors the time between transmission of the request packet and reception of the response packet at the time of completion of the request process, and retransmits the request packet to the arithmetic unit 20 if a timeout is detected. Retransmission of the request packet is performed according to a request queue, that is, per request. Therefore, the I/O processor 10 does not include a buffer for retransmitting packets. When receiving a response packet from the arithmetic unit 20, the I/O processor 10 does not make an ACK/NACK response for delivery confirmation to the arithmetic unit 20 at all. When a transmission error is detected in the response packet, the response packet is only discarded, a timeout is detected after a predetermined time period, and the request packet is retransmitted to the arithmetic unit 20. After this retransmission, a request process is performed again in the arithmetic unit 20, which is at a request receiving end. For the response packets that have been made redundant, a packet received normally first is used, and the following identical packet or packets is/are discarded as a redundant packet or redundant packets.

When receiving a request packet, the arithmetic unit 20 at the receiving end of the request process does not make an ACK/NACK response for delivery confirmation to the I/O processor 10 at all. If a transmission error is detected in the request packet, the request packet is discarded only. As for a response packet to the I/O processor 10 to a request for which rerunning of a request process is impossible, packet transfer is made redundant so that at least one is normally received by the I/O processor 10.

To make the packet transfer redundant, a transmitting end of redundant packets may define a maximum transmission interval between the identical packets and guarantee that the receiving end will receive the plural identical packets within that time interval. If successive transmission errors are detected within the time period of the maximum transmission interval, these errors may be treated as a fatal error, thereby preventing malfunction of the system in a situation where all redundant packet transfers cause errors and fail. For example, if the maximum transmission interval for redundant packets is 1 millisecond, the time period between a transmission time of the first redundant packet and a transmission time of the last redundant packet is 1 millisecond at maximum. Therefore, if transmission errors successively occur within the 1 millisecond, at the receiving end of the redundant packet, it is determined that an error may have occurred in all redundant packets, the process is stopped as occurrence of a fatal error, and a warning is output. By this stopping and warning, it is possible to prevent malfunction of the system. That is, it is possible to prevent the system from regarding the request to which all the redundant responses have failed as not completed and rerunning the request when the request process has been actually completed.

Figure 2:
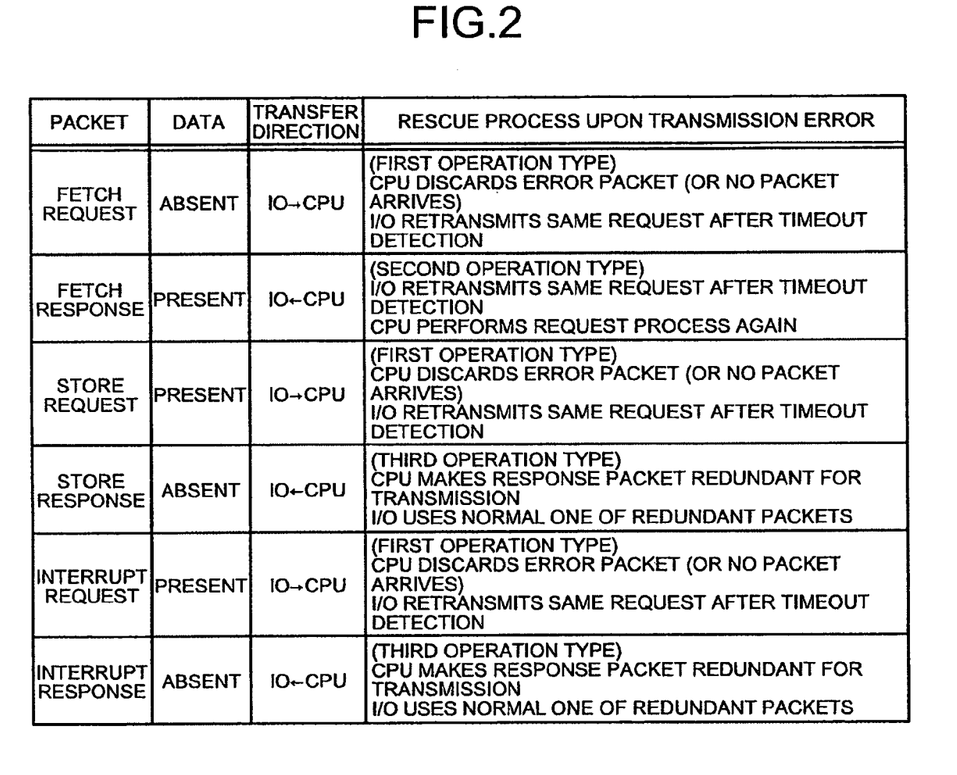
FIG. 2 is a table of types of packets transmitted between an I/O processor and an arithmetic unit and rescue processes upon transmission errors.

FIG. 2 is a table of types of packets transmitted between the I/O processor 10 and the arithmetic unit 20 and rescue processes upon transmission errors. As listed in FIG. 2, if an error occurs during transmission of a fetch request packet from the I/O processor 10 to the arithmetic unit 20, the packet does not arrive at the arithmetic unit 20 or an error packet arrives at the arithmetic unit 20. The error packet is discarded at the arithmetic unit 20. No notification with respect to this error is issued from the arithmetic unit 20 to the I/O processor 10. However, since the fetch request is not executed, no response is transmitted to the I/O processor 10. Therefore, in the I/O processor 10, the request is timed out, and the target request, that is, the same fetch request, is transmitted again to the arithmetic unit 20.

If an error occurs during transmission of a fetch response packet from the arithmetic unit 20 to the I/O processor 10, the packet does not arrive at the I/O processor 10 or an error packet arrives at the I/O processor 10. The error packet is discarded by the I/O processor 10. No notification with respect to this error is issued from the I/O processor 10 to the arithmetic unit 20. However, since completion of execution of the fetch request is not confirmed, the request is timed out in the I/O processor 10. Therefore, the I/O processor 10 transmits the target request, that is, the same fetch request, again to the arithmetic unit 20.

When an error occurs during transmission of an interrupt request to the arithmetic unit 20 or a store request, the packet does not arrive at the arithmetic unit 20 or an error packet arrives. The error packet is discarded by the arithmetic unit 20. As in the case of an error during transmission of the fetch request, no error notification is issued from the arithmetic unit 20 to the I/O processor 10, the store request or the interrupt request is not executed, and thus no response is transmitted from the arithmetic unit 20 to the I/O processor 10. Therefore, the request is timed out in the I/O processor 10, and the target request is transmitted again to the arithmetic unit 20.

As for a response to the store request or interrupt request, the arithmetic unit 20 makes a response packet redundant in advance and transmits the redundant response packets to the I/O processor 10. The I/O processor 10 uses a normal one of the redundant response packets. Therefore, even when an error occurs during transmission of the response packets, the I/O processor 10 can obtain a normal response.

As described, in the case of a transmission error of the fetch response packet, instead of retransmitting the response packet from the arithmetic unit 20, the request process is performed again by reissuing the request from the I/O processor 10, thereby rescuing the transmission error. This is because, even if the request is reissued, there is no influence due to re-access to a cache memory or main memory, considering the nature of fetch-accesses.

As for the store response and the interrupt response, influence due to re-access is large, so the request process is not performed again. The response packet of the store response or the interrupt response is not accompanied by response data and thus is small in size. Therefore, transfer is made redundant to make sure that at least one is normally received.

That is, in serial transmission of the computer system 1, a transmission error is rescued by three types of operations. In a first operation type, the arithmetic unit 20 discards the error packet, and the I/O processor 10 detects a timeout and retransmits the request packet. The first operation type is applied when a transmission error occurs in a fetch request, a store request, or an interrupt request. In a second operation type, the I/O processor 10 discards an error packet, and the I/O processor 10 detects a timeout and retransmits the request packet to the arithmetic unit 20. The second operation type is applied when a transmission error occurs in a fetch response. In a third operation type, the packet is made redundant by the arithmetic unit 20, and a normal packet is selected by the I/O processor 10 for use. The third operation type is applied to a store response and an interrupt response.

Figure 3:
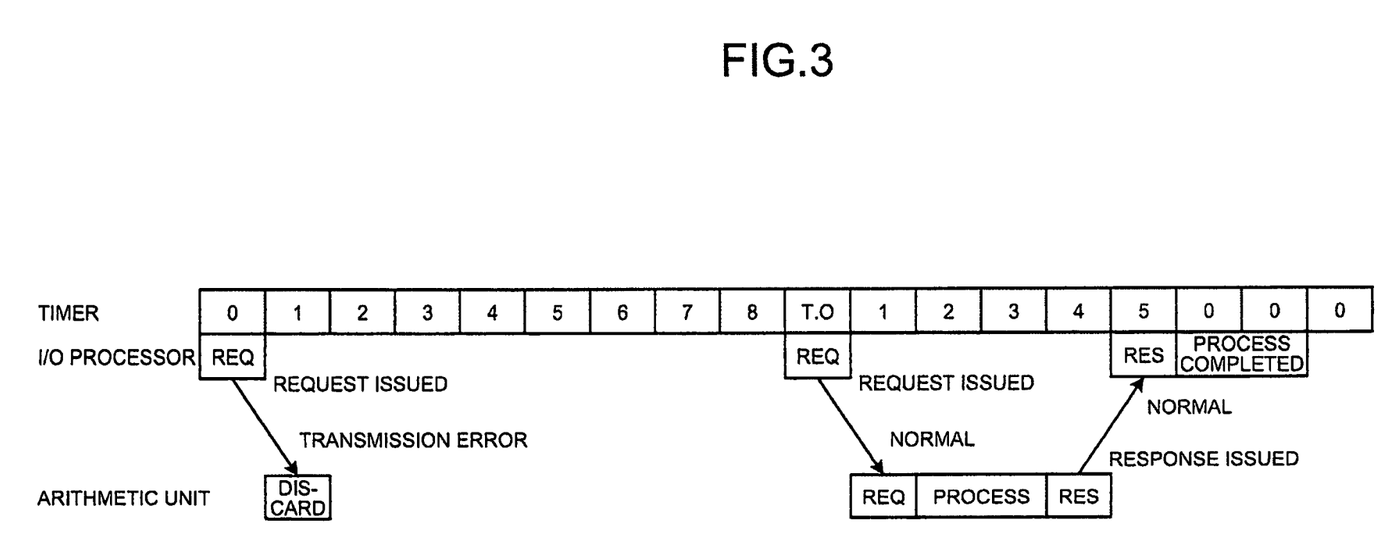
FIG. 3 is an explanatory diagram for a rescue operation according to a first operation type listed in FIG. 2.

FIG. 3 is an explanatory diagram for a rescue operation according to the first operation type. In FIG. 3, the I/O processor 10 issues a request REQ and starts the timer. However, the request REQ is discarded by the arithmetic unit 20 when a transmission error occurs during transmission. As a result, the timer counts up to 8 to time-out (T.O. in FIG. 3) without obtaining a response from the arithmetic unit 20. The I/O processor 10 then reissues the request REQ and restarts the timer.

In FIG. 3, the reissued request REQ is normally transmitted and received by the arithmetic unit 20. The arithmetic unit 20 then processes the received request and issues a response RES to the I/O processor 10. The response RES is normally transmitted and received by the I/O processor 10. The I/O processor 10 then resets the timer to complete the process.

Figure 4:
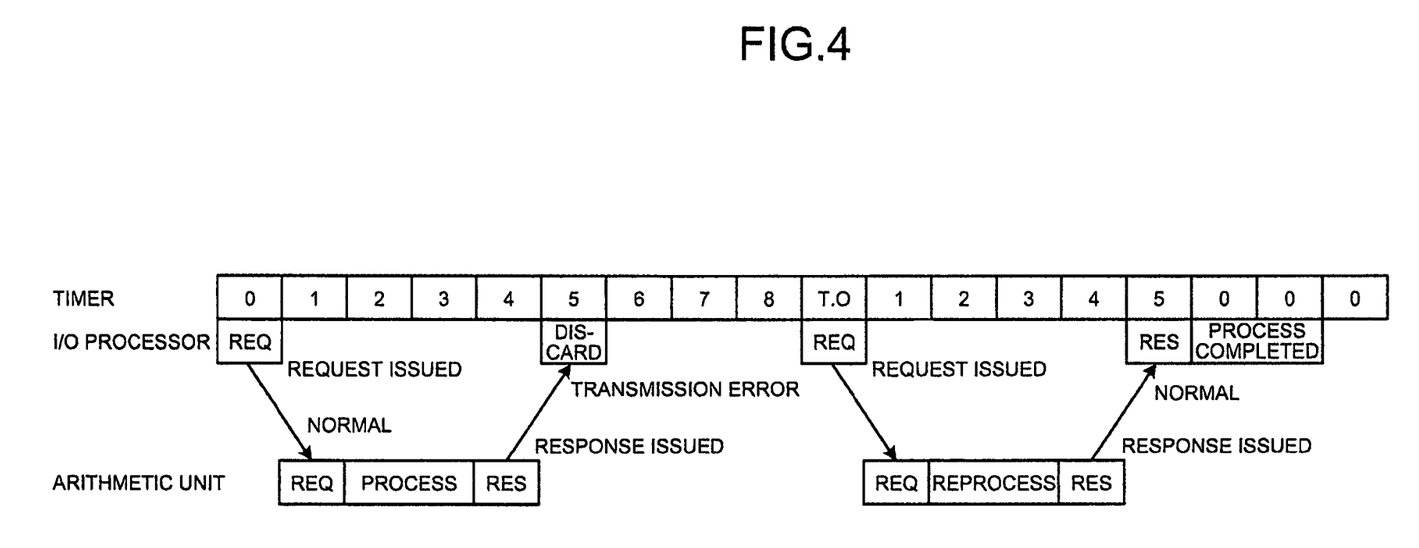
FIG. 4 is an explanatory diagram for a rescue operation according to a second operation type listed in FIG. 2.

FIG. 4 is an explanatory diagram for a rescue operation according to the second operation type. In FIG. 4, the I/O processor 10 issues a request REQ to the arithmetic unit 20 and starts the timer. The request REQ is normally transmitted and received by the arithmetic unit 20. The arithmetic unit 20 then processes the received request and issues a response RES.

However, a transmission error occurs in the response RES during transmission, and is discarded by the I/O processor 10. As a result, the timer counts up to 8 to time-out without obtaining a normal response from the arithmetic unit 20. The I/O processor 10 then reissues the request REQ and restarts the timer.

The reissued request REQ is normally transmitted and received by the arithmetic unit 20. The arithmetic unit 20 then processes the request REQ again and issues a response RES similarly as done previously. The response RES is normally transmitted and received by the I/O processor 10. The I/O processor 10 then resets the timer to complete the process.

Figure 5:
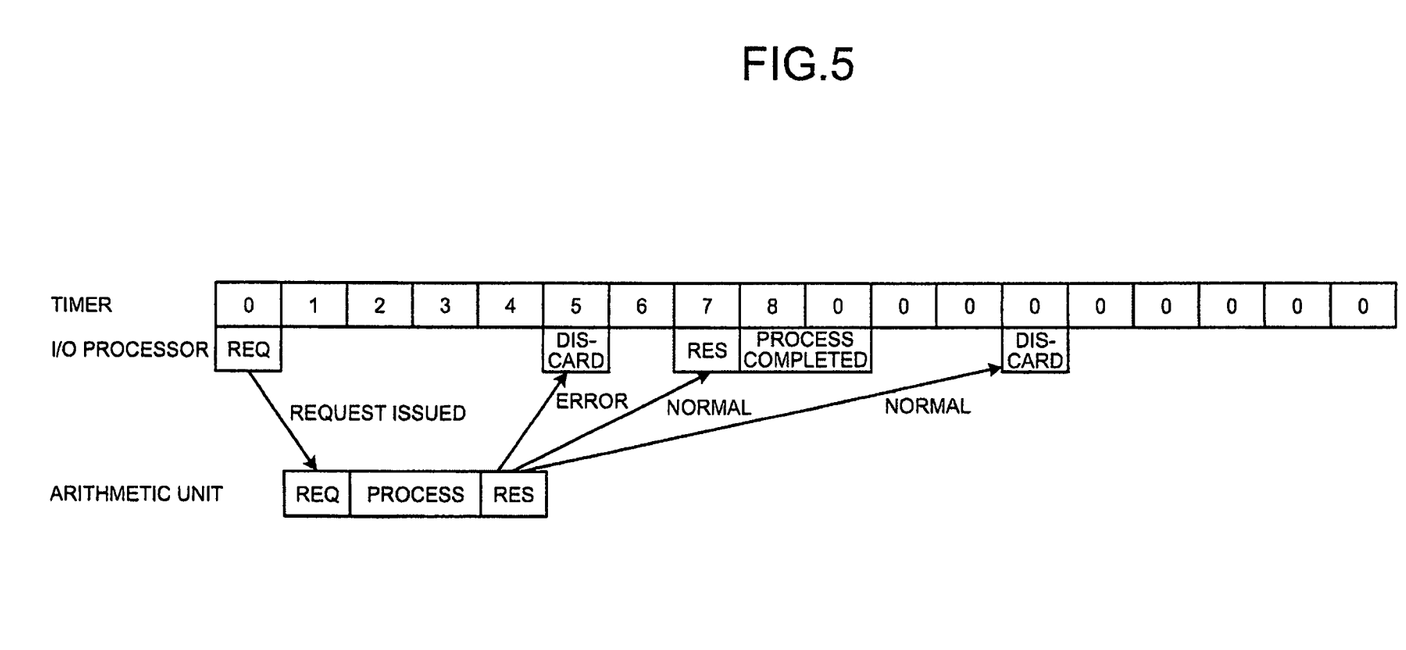
FIG. 5 is an explanatory diagram for a rescue operation according to a third operation type listed in FIG. 2.

FIG. 5 is an explanatory diagram for a rescue operation according to the third operation type. In FIG. 5, the I/O processor 10 issues a request REQ and starts the timer. The request REQ is normally transmitted and received by the arithmetic unit 20. The arithmetic unit 20 processes the received request and issues a response RES. The arithmetic unit 20 generates a plurality of responses RES having the same contents and transmits the plurality of responses.

From among the responses RES having the same contents, the I/O processor 10 discards a response RES in which an error has occurred, receives a normal response RES and resets the timer, and then completes the process. Once the normal response RES is received, the I/O processor 10 discards the other redundant responses RES even if they are normal.

Figure 6:
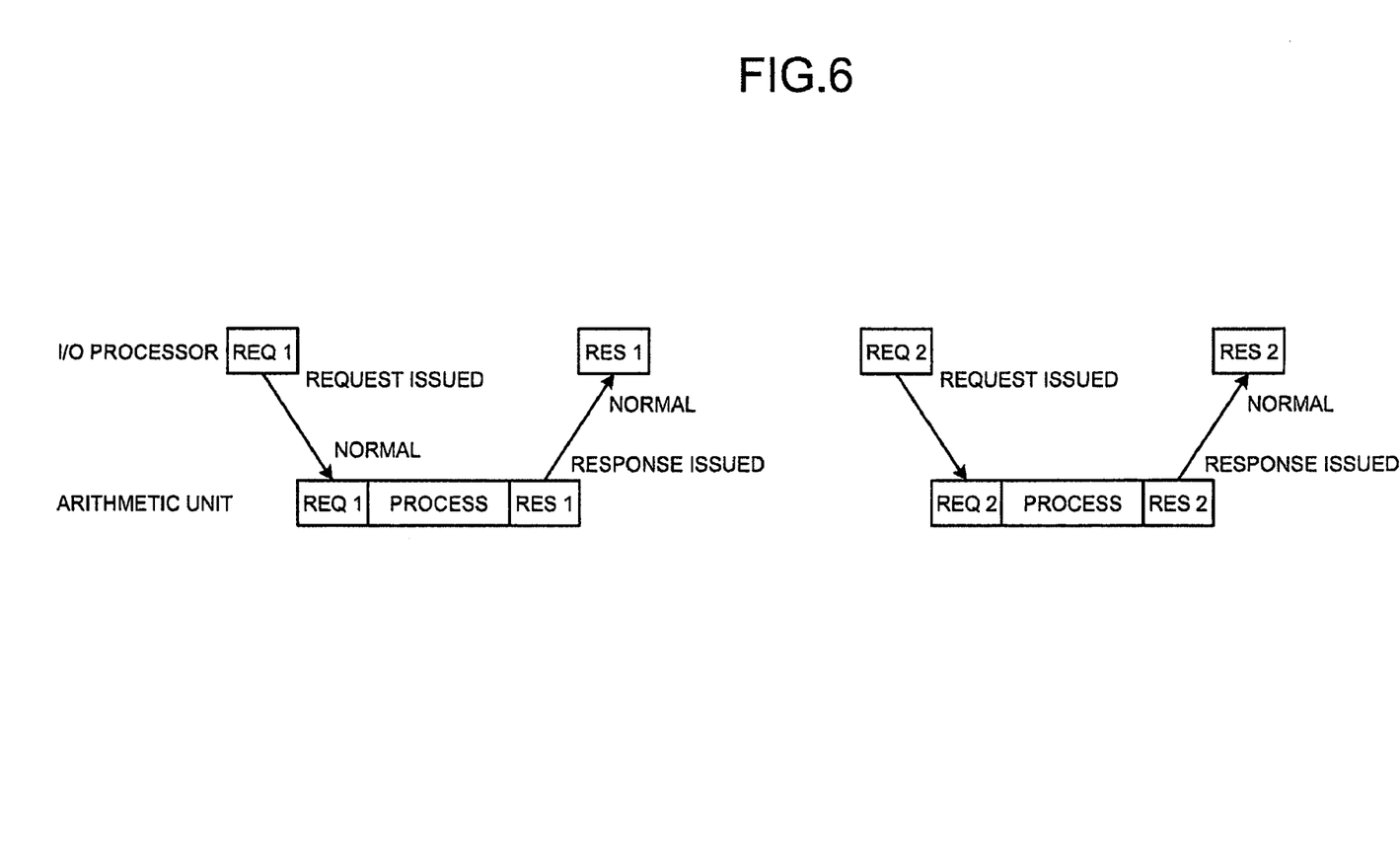
FIG. 6 is an explanatory diagram for an operation of guaranteeing a sequential order by the I/O processor.

Next, guarantee of sequential order of the requests is explained. FIG. 6 is an explanatory diagram for an operation of guaranteeing a sequential order by the I/O processor 10. In FIG. 6, when there is a subsequent request that must not overtake the process of the preceding request, the I/O processor 10, which is a requesting source of the request, issues the subsequent request to the arithmetic unit 20 after receiving a response to the preceding request. This is to prevent the process on the subsequent request from being overtaken during a retry upon a transmission error in the preceding request. According to this method, the sequential order of memory accesses is guaranteed by the I/O processor 10 alone.

Figure 7:
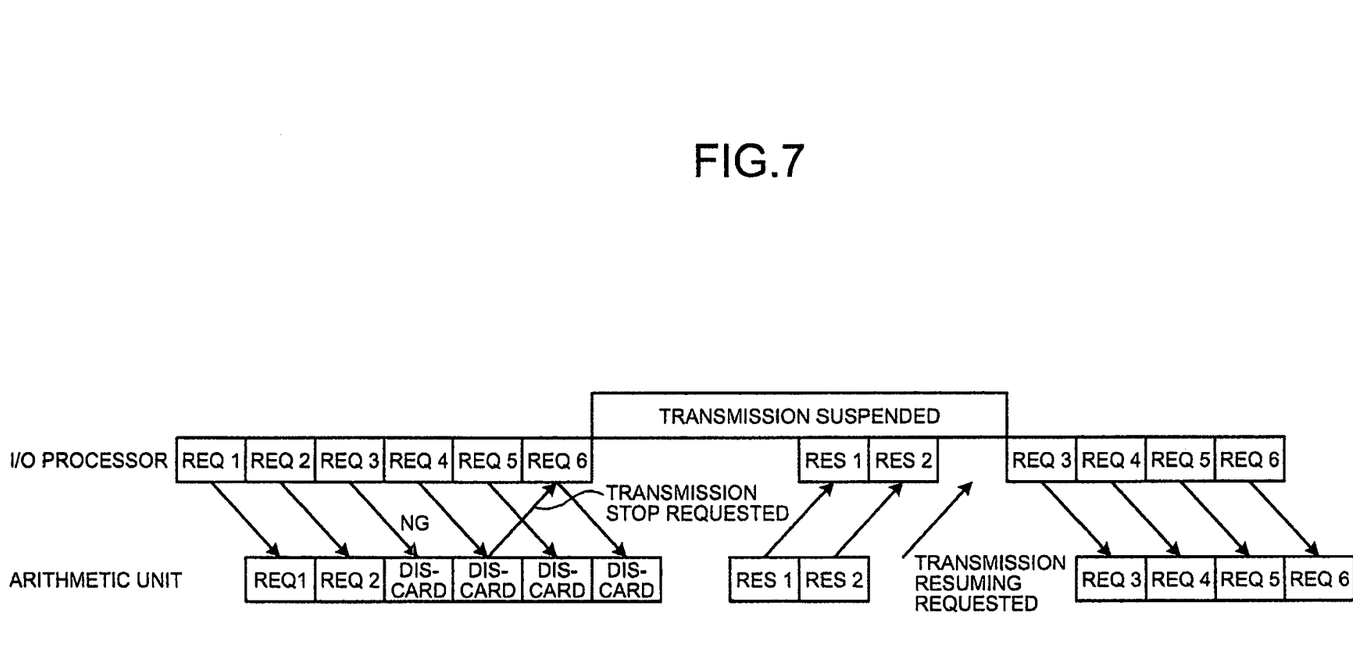
FIG. 7 is an explanatory diagram for an operation of guaranteeing a sequential order by the I/O processor and the arithmetic unit.

FIG. 7 is an explanatory diagram for an operation of guaranteeing a sequential order by the I/O processor 10 and the arithmetic unit 20. In FIG. 7, when processes of REQ 1 to REQ 6 are to be processed without changing the sequential order, the I/O processor 10 sequentially transmits each request without waiting for reception of a response to each previous request. The arithmetic unit 20 performs the request processes in the sequential order the requests are received from the I/O processor 10. When a transmission error occurs as in REQ 3, the arithmetic unit 20 discards all packets received thereafter, that is, all packets from REQ 4 onward, and then requests the I/O processor 10 to stop transmission of the following requests.

Upon receiving the request to stop the transmission, the I/O processor 10 stops newly transmitting the requests. The arithmetic unit 20 processes the already-received request or requests and transmits a response or responses RES. Upon completion of the process on all already-received requests and transmission of the corresponding responses, the arithmetic unit 20 requests the I/O processor 10 to resume transmission of the requests. In response to this request to resume, the I/O processor 10 resumes transmission of non-completed requests in a request queue from REQ 3 to the arithmetic unit 20 according to the sequential order. Accordingly, the sequential order of memory accesses is guaranteed by both of the I/O processor 10 and the arithmetic unit 20, thereby achieving a higher speed than that in the operation of guaranteeing the sequential order by the I/O processor 10 alone.

Figure 8:
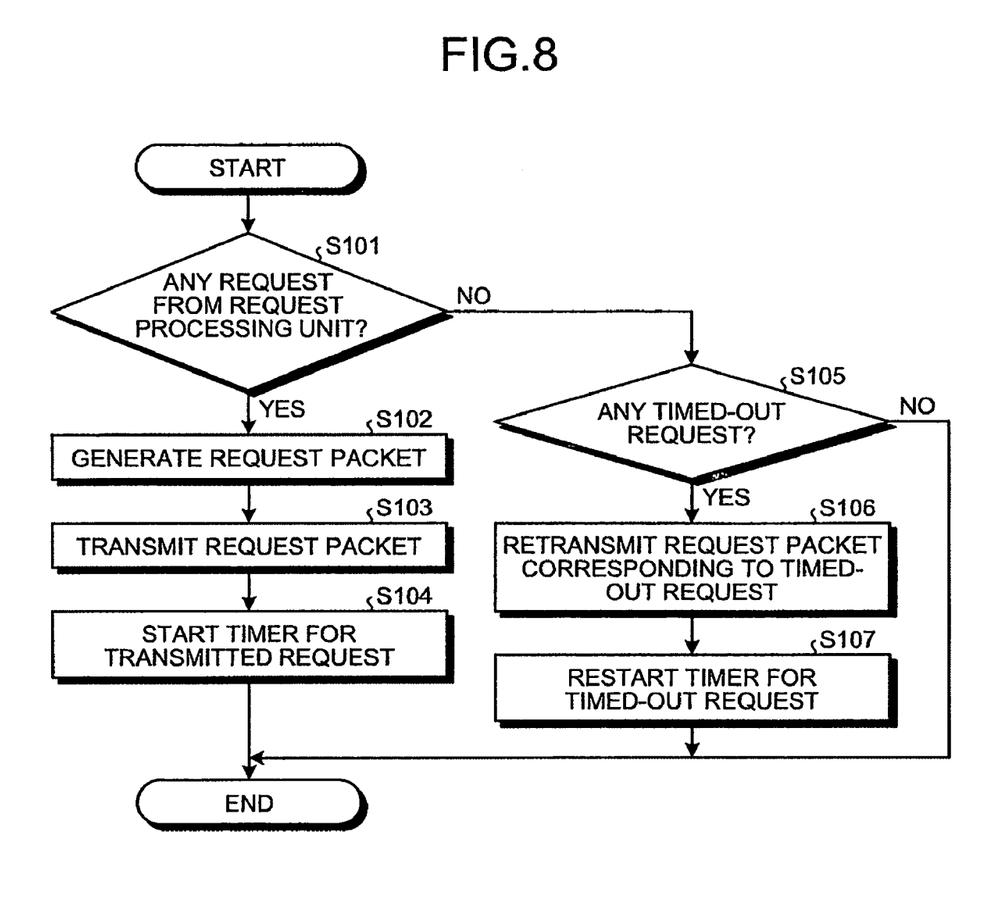
FIG. 8 is a flowchart for a process operation of a request transmitting unit.

Next, process operations of the request transmitting unit 12, the response receiving unit 13, the request receiving unit 22, and the response transmitting unit 23 depicted in FIG. 1 are explained. FIG. 8 is a flowchart for a process operation of a request transmitting unit 12.

As depicted in FIG. 8, the request transmitting unit 12 determines whether a request from the request processing unit 11 has been made (S101). If a request from the request processing unit 11 has been made ("Yes" at S101), the request transmitting unit 12 generates a request packet (S102), and then transmits the request packet (S103). The request transmitting unit 12 starts the timer for the transmitted request (S104), and then ends the process.

If no request from the request processing unit 11 has been made ("No" at S101), the request transmitting unit 12 determines whether there is a timed-out request (S105). If there is a timed-out request ("Yes" at S105), the request transmitting unit 12 retransmits the request packet for the timed-out request (S106), restarts the timer for the retransmitted request (S107), and then ends the process.

If there is no timed-out request ("No" at S105), the request transmitting unit 12 ends the process. The process depicted in FIG. 8 is a main flow by the request transmitting unit 12, and is repeatedly executed during the operation of the computer system 1.

Figure 9:
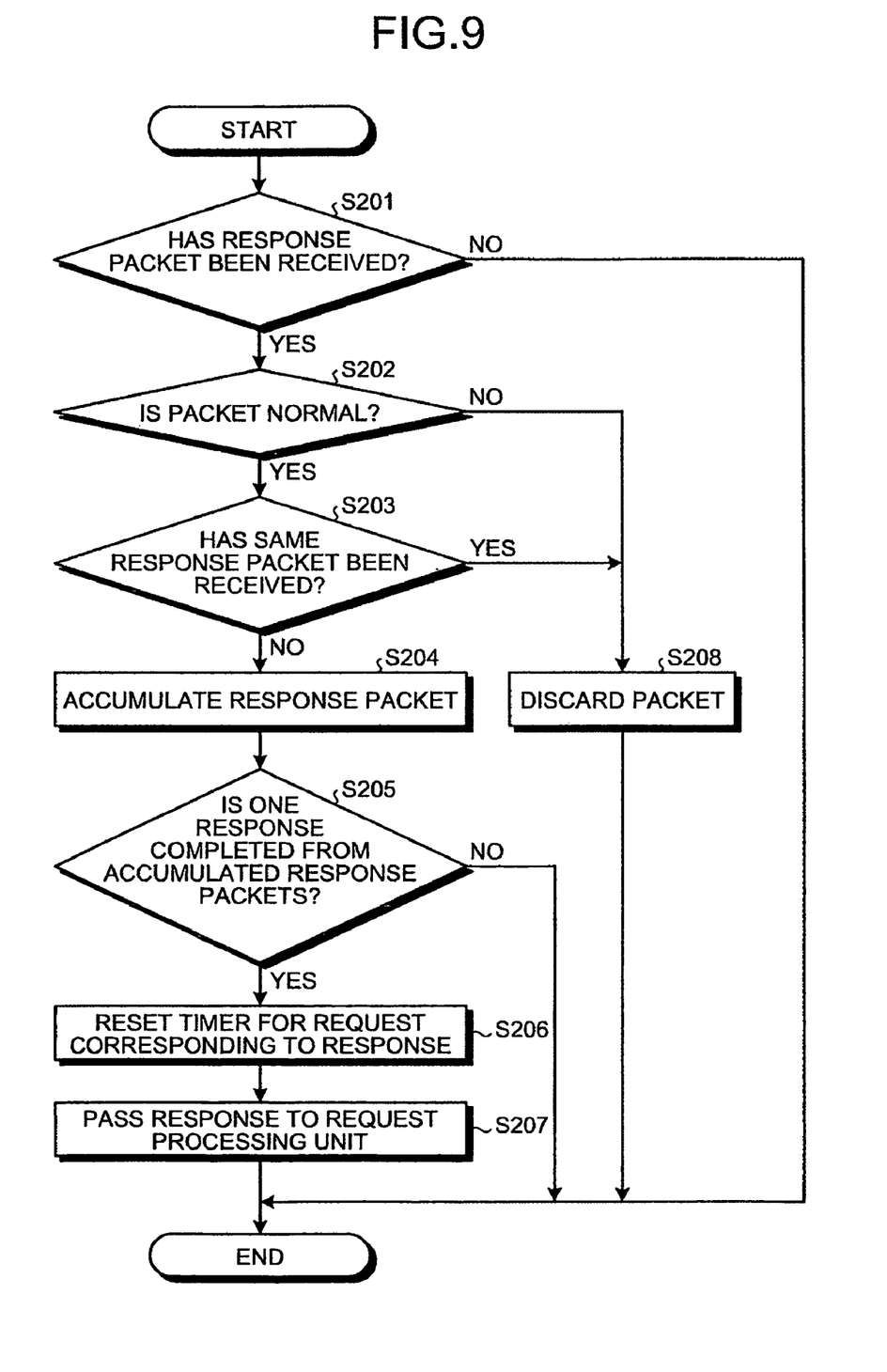
FIG. 9 is a flowchart for a process operation of a response receiving unit.

FIG. 9 is a flowchart for a process operation of the response receiving unit 13. As depicted in FIG. 9, the response receiving unit 13 first checks whether a response packet has been received (S201). If no response packet has been received ("No" at S201), the process ends. If a response packet has been received ("Yes" at S201), the error packet discarding unit 13a determines whether the received packet is normal (S202). If the received packet is not normal ("No" at S202), the error packet discarding unit 13a discards the packet (S208), and ends the process.

When the received packet is normal ("Yes" at S202), the redundant packet discarding unit 13b determines whether the same response packet has been received already (S203). If the same response packet has been received already ("Yes" at S203), the redundant packet discarding unit 13b discards the packet (S208), and ends the process.

If the same response packet has not been received already ("No" at S203), the response receiving unit 13 accumulates the received response packet (S204), and then determines whether one response is completed from the accumulated response packets (S205). When one response is not completed from the accumulated response packets ("No" at S205), the process ends.

When one response is completed from the accumulated response packets ("Yes" at S205), the response receiving unit 13 resets the timer for a request corresponding to the completed response (S206), passes the response to the request processing unit 11 (S207), and then ends the process. The process depicted in FIG. 9 is a main flow by the response receiving unit 13, and is repeatedly executed during the operation of the computer system 1.

Figure 10:
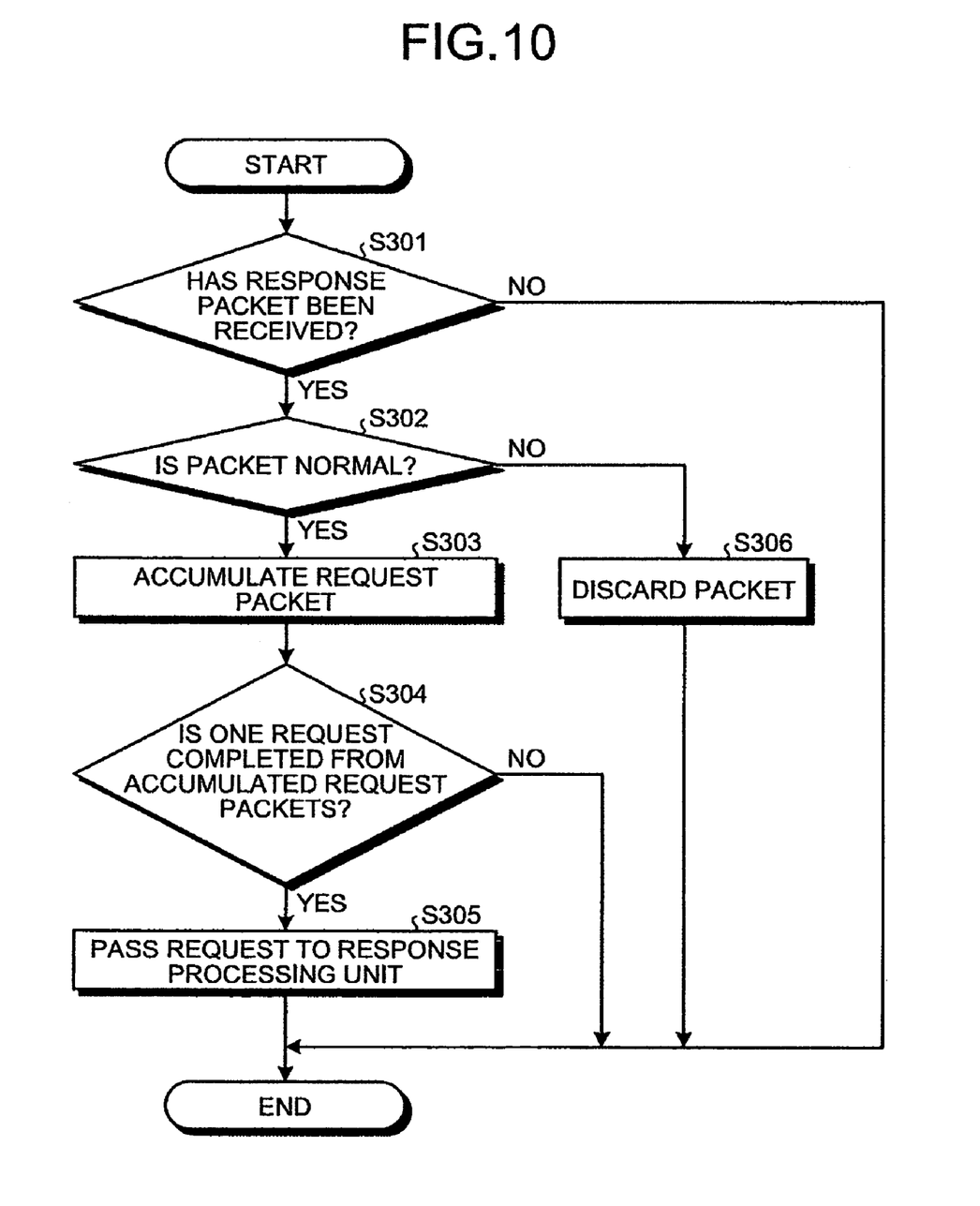
FIG. 10 is a flowchart for a process operation of a request receiving unit.

FIG. 10 is a flowchart for a process operation by the request receiving unit 22. As depicted in FIG. 10, the request receiving unit 22 checks whether a request packet has been received (S301). If no request packet has been received ("No" at S301), the process ends. If a request packet has been received ("Yes"

at S301), the error packet discarding unit 22a determines whether the received packet is normal (S302). If the received packet is not normal ("No" at S302), the error packet discarding unit 22a discards the packet (S306), and ends the process.

If the received packet is normal ("Yes" at S302), the request receiving unit 22 accumulates the received request packet (S303), and then determines whether one request is completed from the accumulated request packets (S304). When one request is not completed from the accumulated request packets ("No" at S304), the process ends.

When one request is completed from the accumulated request packets ("Yes" at S304), the request receiving unit 22 passes the completed request to the response processing unit 21 (S305), and then ends the process. The process depicted in FIG. 10 is a main flow by the request receiving unit 22, and is repeatedly executed during the operation of the computer system 1.

Figure 11:
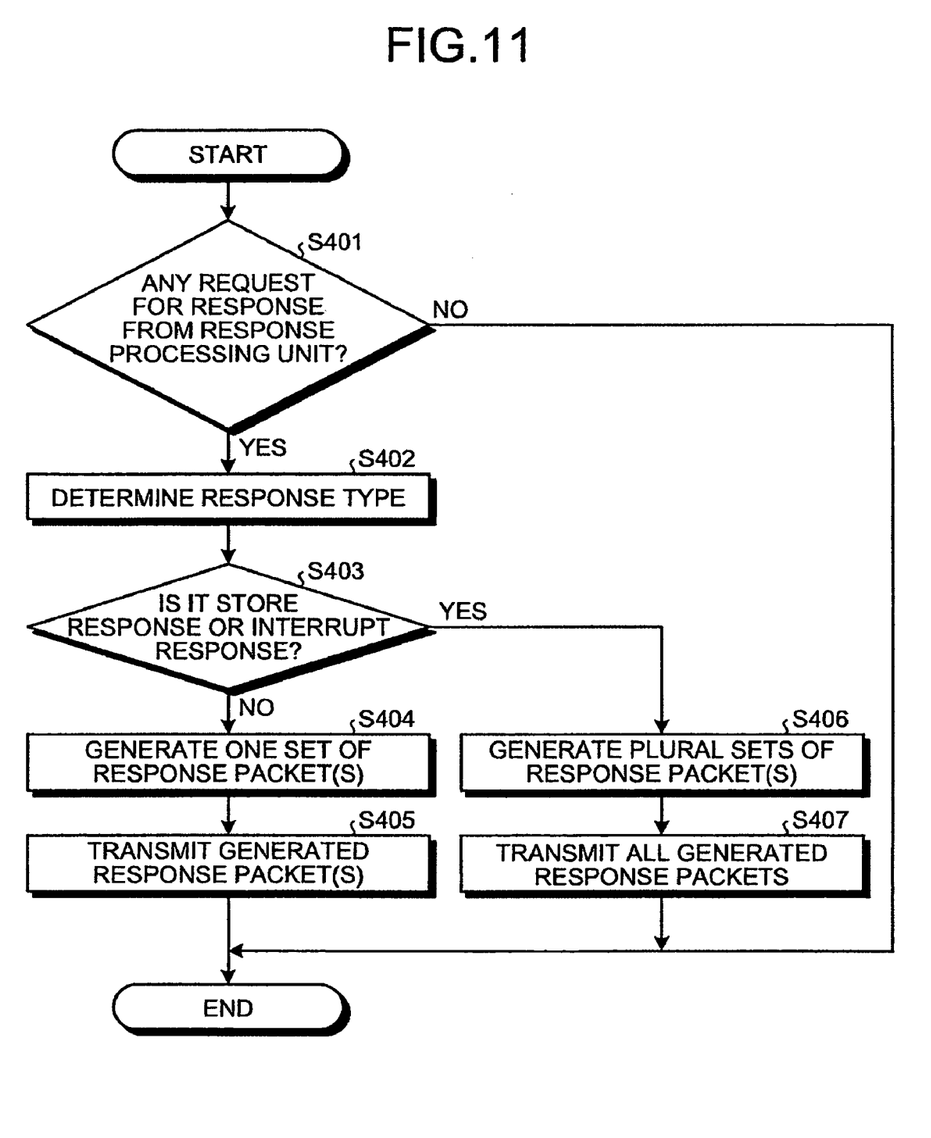
FIG. 11 is a flowchart for a process operation of a response transmitting unit.

FIG. 11 is a flowchart for a process operation of the response transmitting unit 23. As depicted in FIG. 11, the response transmitting unit 23 determines whether a response has been requested from the response processing unit 21 (S401). If no response has been requested from the response processing unit 21 ("No" at S401), the process ends.

If a response has been requested from the response processing unit 21 ("Yes" at S401), the response type determining unit 23a determines the response type (S402). If the response type is neither a store response nor an interrupt response ("No" at S403), the response transmitting unit 23 generates one set of a response packet or response packets (S404), transmits the generated response packet/packets (S405), and ends the process. Generating one set means that, when a response is transmitted as a response packet, only one packet is generated if one response can be transmitted in one response packet, and, if a plurality of packets are required to form one response, one packet is generated for each of these packets. Thus, there are no redundant packets within each set.

When the response type is either a store response or an interrupt response ("Yes" at S403), the response redundancy processing unit 23b generates plural sets of response packets (S406). The response transmitting unit 23 then transmits all the generated response packets (S407), and ends the process. The process depicted in FIG. 11 is a main flow by the response transmitting unit 23, and is repeatedly executed during the operation of the computer system 1.

As explained above, in the computer system 1 functioning as a transmission system in the present embodiment, the I/O processor 10 and the arithmetic unit 20 function as apparatuses for serial transmission. When transmitting a request to the arithmetic unit 20, the I/O processor 10 does not perform packet-by-packet delivery confirmation, but retransmits the request if the request is timed out. For a response to a request that cannot be rerun or executed again, the arithmetic unit 20 makes the response packet redundant and transmits the redundant packets.

Thus, data transfer performance can be ensured making use of the characteristics of serial transmission. Further, a huge buffer for retransmission and a packet delivery confirmation flow can be eliminated. Furthermore, transmission error rescue can be achieved at low cost.

In the present embodiment, an example utilized with respect to serial transmission has been explained, but the disclosed system, apparatus, and method may also be applied to parallel transmission. That is, in parallel transmission, when a transmission speed is regarded more important than reliability and a recovery system for any occurrence of a transmission error is required, by applying the disclosed system, apparatus, and method, transmission error rescue can be achieved at low cost.

According to the disclosed system, apparatus, and method, it is possible to obtain a transmission system, transmitting apparatus, and transmitting method capable of reducing the circuit scale and performing error rescue by simple control in serial transmission.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A transmission system comprising:
   a first apparatus including
      a request transmitting unit that transmits a request packet as a request, and retransmits the request packet when a time period between the request and a response corresponding to the request exceeds a predetermined time period, and
      a response receiving unit that receives a response packet and a redundant response packet as the response and discards a response packet including an error and a redundant response packet identical to already received response packet; and
   a second apparatus coupled to the first apparatus via a transmission path through which the request from the first apparatus to the second apparatus is transmitted and the response from the second apparatus to the first apparatus is received, the second apparatus including
      a request receiving unit that receives the request packet, and
      a response transmitting unit that generates the response packet in response to the received request packet and the redundant response packet in response to a request that requires a sequential processing order to be guaranteed, and transmits the generated response packet and the generated redundant response packet to the first apparatus.

2. The transmission system according to claim 1, wherein the first apparatus is an I/O processing apparatus that performs input/output to/from a computer system, and the second apparatus is a processor that performs processing in the computer system.

3. The transmission system according to claim 1, wherein the response transmitting unit generates the redundant response packet in response to an interrupt request with respect to a process of the second apparatus, and transmits the generated redundant response packets.

4. The transmission system according to claim 1, wherein the response transmitting unit does not generate the redundant response packet in response to a data read request.

5. The transmission system according to claim 1, wherein when the first apparatus transmits a request requiring a sequential processing order to be guaranteed to the second apparatus, the first apparatus receives the response to the request and thereafter transmits a next request.

6. The transmission system according to claim 1, wherein when the second apparatus receives a response packet including an error from the first apparatus, the second apparatus transmits a request to stop transmission to the first apparatus, discards any packet received thereafter, and the second apparatus transmits a request to resume transmission to the first apparatus when a response to any request received before receiving the response packet including the error is completed.

7. A transmitting apparatus connected to another apparatus via a transmission path, the transmitting apparatus comprising:
- a request receiving unit that receives a request packet from the another apparatus as a request via the transmission path;
- a response processing unit that generates a response packet in response to the received request packet, and generates a redundant response packet in response to a request that requires a sequential processing order to be guaranteed; and
- a response transmitting unit that transmits the generated response packet and the generated redundant response packet to the another apparatus via the transmission path.

8. A transmitting method comprising:
- transmitting a request packet as a request from a first apparatus to a second apparatus coupled to the first apparatus via a transmission path;
- retransmitting the request packet from the first apparatus to the second apparatus when a time period between the request and a response corresponding to the request exceeds a predetermined time period;
- receiving by the second apparatus, the request packet from the first apparatus;
- generating by the second apparatus, a response packet in response to the received request packet and a redundant response packet in response to a request that requires a sequential processing order to be guaranteed;
- transmitting by the second apparatus, the generated response packet and the generated redundant response packet;
- receiving the response packet and the redundant response packet as the response from the second apparatus by the first apparatus; and
- discarding by the first apparatus, a response packet including an error and a redundant response packet identical to already received response packet.

* * * * *